United States Patent
Takase et al.

(10) Patent No.: US 9,379,649 B2
(45) Date of Patent: Jun. 28, 2016

(54) LINEAR MOTOR SYSTEM

(71) Applicant: KABUSHIKI KAISHA YASKAWA DENKI, Kitakyushu-shi (KR)

(72) Inventors: Yoshiyasu Takase, Kitakyushu (JP); Shinya Morimoto, Kitakyushu (JP); Toru Shikayama, Kitakyushu (JP); Minoru Koga, Kitakyushu (JP); Nobuhiro Umeda, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 294 days.

(21) Appl. No.: 14/224,071

(22) Filed: Mar. 25, 2014

(65) Prior Publication Data

US 2015/0035458 A1    Feb. 5, 2015

(30) Foreign Application Priority Data

Aug. 2, 2013    (JP) .................. 2013-161653

(51) Int. Cl.
*H02P 1/00* (2006.01)
*H02P 6/00* (2016.01)
*H02P 25/06* (2016.01)

(52) U.S. Cl.
CPC .............. *H02P 6/006* (2013.01); *H02P 23/22* (2016.02); *H02P 25/06* (2013.01)

(58) Field of Classification Search
CPC ......... H02P 25/06; H02P 6/006; H02P 8/005; H02K 41/0356
USPC ............. 318/135, 632, 635, 637, 687, 66, 68, 318/163, 438
See application file for complete search history.

(56) References Cited

U.S. PATENT DOCUMENTS

| | | | | |
|---|---|---|---|---|
| 4,220,899 A * | 9/1980 | von der Heide | ..... | H02K 41/031 104/290 |
| 4,303,870 A * | 12/1981 | Nakamura | ............ | B60L 13/006 104/290 |
| 5,220,259 A * | 6/1993 | Werner | ................ | F04B 49/065 318/432 |
| 5,723,963 A * | 3/1998 | Li | ............................ | G05B 7/02 318/590 |
| 8,415,915 B2 * | 4/2013 | Sepe, Jr. | .................. | H02P 6/006 318/687 |

FOREIGN PATENT DOCUMENTS

JP    2011-120454    6/2011

* cited by examiner

*Primary Examiner* — Bentsu Ro
*Assistant Examiner* — Thai Dinh
(74) *Attorney, Agent, or Firm* — Mori & Ward, LLP (57) ABSTRACT

A linear motor system includes a stator, a mover, and a controller. The stator includes a plurality of armature coil units arranged so as to be spaced apart from one another at certain intervals. The mover includes a permanent magnet. The controller is configured to sequentially select, as a power-feeding target, an armature coil unit opposing the mover from among the plurality of armature coil units, perform, for the power-feeding target, computation for power-feeding control on the basis of a speed command, and sequentially feed power to the armature coil unit. The controller includes a power-feeding-switching compensation function of performing switching compensation when the power-feeding target is switched to a next armature coil unit.

18 Claims, 9 Drawing Sheets

LINEAR MOTOR SYSTEM

CROSS-REFERENCE TO RELATED APPLICATIONS

The present disclosure contains subject matter related to that disclosed in Japanese Priority Patent Application JP 2013-161653 filed in the Japan Patent Office on Aug. 2, 2013, the entire contents of which are hereby incorporated by reference.

BACKGROUND

1. Field of the Invention

The embodiments disclosed herein relate to linear motor systems.

2. Description of the Related Art

There are linear motor systems which include a stator including a plurality of armature coil units, a mover arranged so as to oppose the stator, and a controller configured to control power-feeding to the stator (see, for example, Japanese Unexamined Patent Application Publication No. 2011-120454).

In such linear motor systems, the plurality of independent armature coil units are consecutively arranged along the moving direction of the mover. Each armature coil unit is provided with a corresponding power converter. The controller switches the target power converter in accordance with the present position of the mover, and supplies driving power from the target power converter to the armature coil unit corresponding to the present position of the mover. In this way, thrust is produced and consequently the mover is moved.

Installation of the above-described linear motor systems over a long distance involves an increase in the number of armature coil units, making such linear motor systems costly.

SUMMARY

According to an aspect of the disclosure, there is provided a linear motor system including a stator, a mover, and a controller. The stator includes a plurality of armature coil units linearly arranged so as to be spaced apart from one another at certain intervals. The mover is arranged so as to oppose the stator and includes a permanent magnet. The controller is configured to sequentially select an armature coil unit opposing the mover from among the plurality of armature coil units, the selected armature coil unit serving as a power-feeding target, perform, for the power-feeding target, computation for power-feeding control on the basis of a speed command, and sequentially feed power to the armature coil unit serving as the power-feeding target in accordance with a result of the computation so as to drive the mover. The controller includes a power-feeding-switching compensation function of performing, when the power-feeding target is switched to a next armature coil unit, switching compensation related to power-feeding control performed on the next armature coil unit.

DESCRIPTION OF THE EMBODIMENTS

An embodiment of a linear motor system disclosed herein will be specifically described below with reference to the accompanying drawings. Note that the present disclosure is not limited to the embodiment below.

Figure 1A:
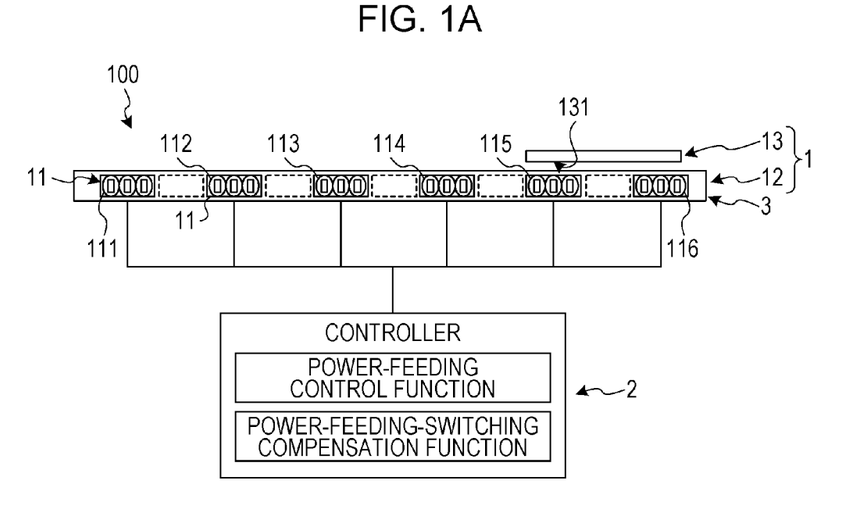
FIG. 1A is an explanatory diagram illustrating a linear motor system according to an embodiment.

FIG. 1A is an explanatory diagram illustrating a linear motor system according to an embodiment. As illustrated in FIG. 1A, a linear motor system 100 includes a linear motor 1 and a controller 2.

The linear motor 1 according to the present embodiment includes a stator 12 and a mover 13. The stator 12 includes a plurality of armature coil units 11 each including a set of coils. The mover 13 is arranged so as to oppose the stator 12.

The number of armature coil units 11 may be set to any given value. For simplicity of explanation, it is assumed hereinafter that the stator 12 includes six armature coil units 11. The six armature coil units 11 may be referred to as a first unit 111 to a sixth unit 116 below for convenience.

The linear motor 1 is a moving magnet (MM) linear motor, and the mover 13 includes a permanent magnet 131.

The stator 12 includes the six armature coil units 11 which are linearly arranged at predetermined intervals and form a movement path 3 for the mover 13. That is, the six armature coil units 11 are arranged spaced apart from one another along the moving direction of the mover 13. This configuration consequently reduces the number of wiring lines and the cost, and can be suitably used for long-distance transportation, for example.

As illustrated in FIG. 1A, the length of the mover 13 along the movement path 3 is set to be longer than or equal to the length of each armature coil unit 11 along the movement path 3. The six armature coil units 11 are arranged such that the mover 13 temporarily covers at least one of the armature coil units 11.

The controller 2 has a power-feeding control function. Specifically, the controller 2 sequentially switches the power-feeding target to the armature coil unit 11 located at a portion covered with the opposing mover 13, and sequentially feeds power to the armature coil unit 11 serving as the power-feeding target. In this way, the controller 2 drives the mover 13.

Specifically, such a power-feeding control function is a function of performing, for each of the armature coil units 11 serving as the power-feeding target, computation for power-feeding control on the basis of a speed command; and of sequentially feeding power to the armature coil unit 11 serving as the power-feeding target, on the basis of the computation result. In this way, the controller 2 can drive the mover 13.

The controller 2 also has a power-feeding-switching compensation function of performing, when the armature coil unit 11 serving as the power-feeding target is switched to the next one, switching compensation related to power-feeding control performed on the next armature coil unit 11.

Specifically, when switching the armature coil unit 11 serving as the power-feeding target to the next one, the controller 2 of the linear motor system 100 according to the present embodiment also sequentially switches a power-feeding control process for the power-feeding target.

When the power-feeding control process is switched, shock (i.e., so-called switching shock) possibly occurs because of a change in the speed of the mover 13. However, the added power-feeding-switching compensation function permits the linear motor system 100 according to the present embodiment to effectively suppress the switching shock that occurs when the armature coil unit 11 serving as the power-feeding target is switched to the next one.

Figure 1B:
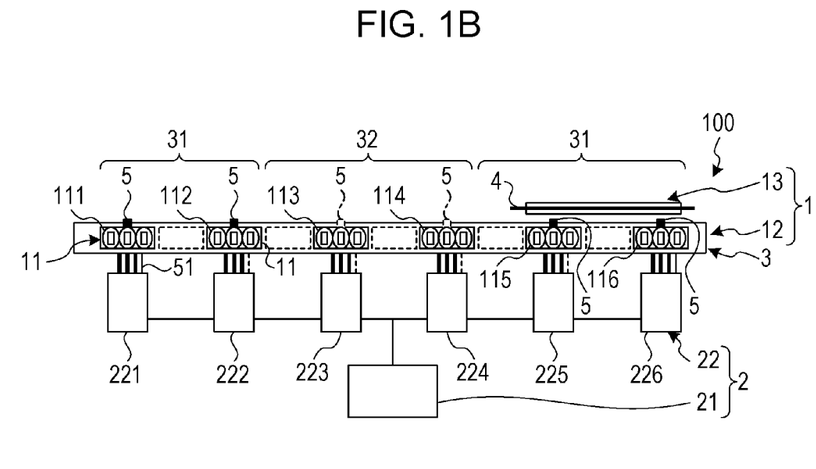
FIG. 1B is a diagram illustrating an example of a specific configuration of the linear motor system according to the embodiment.

Now, the linear motor system 100 according to the present embodiment will be described with reference to FIG. 1B which illustrates an example of the more specific configuration of the controller 2. FIG. 1B is a diagram illustrating an example of the specific configuration of the linear motor system 100 according to the present embodiment.

As illustrated in FIG. 1B, the controller 2 includes six second controller sections 22 each provided for a corresponding one of the six armature coil units 11, and a first controller section 21 which is a higher-level controller section of these second controller sections 22.

The first controller section 21 outputs a speed command to the second controller sections 22, and sequentially selects, as a target power-feeding controller, the second controller section 22 corresponding to the armature coil unit 11 opposing the mover 13.

The six second controller sections 22 corresponding to the six armature coil units 11 (i.e., the first unit 111 to the sixth unit 116) supply power to the corresponding armature coil units 11. When being selected as the target power-feeding controller, the second controller sections 22 each perform computation for power-feeding control on the basis of a speed command output from the first controller section 21; and feeds power to the corresponding armature coil unit 11 on the basis of the computation result. When performing the computation for power-feeding control, the second controller sections 22 each perform the aforementioned switching compensation related to the power-feeding control process. In the following description, the six second controller sections 22 may be referred to as a first amplifier 221 to a sixth amplifier 226 which correspond to the first unit 111 to the sixth unit 116, respectively.

As illustrated in FIG. 1B, driving power is sequentially supplied from the first amplifier 221 to the sixth amplifier 226 (i.e., the six second controller sections 22) respectively to the first unit 111 to the sixth unit 116 spaced apart from one another, in accordance with the present position of the mover 13. For example, in the case where the armature coil unit 11 opposing the mover 13 changes from the fifth unit 115 to the sixth unit 116 as illustrated in FIG. 1B, the second controller section 22 that supplies power is switched from the fifth amplifier 225 to the sixth amplifier 226.

As illustrated in FIG. 1B, a region of the movement path 3 of the mover 13 where the plurality of armature coil units 11 are arranged are divided into positioning regions 31 and transfer regions 32.

The positioning region 31 is a region where the precise position of the mover 13 is determined using a detection signal (i.e., a position detection signal) of a position sensor (described later). On the other hand, the transfer region 32 is a region where the mover 13 is moved at a substantially constant speed, without using a detection signal of the position sensor.

In the linear motor system 100 according to the present embodiment, the mover 13 includes a linear scale 4 and the armature coil units 11 arranged in the positioning regions 31 each include a scale detection head 5 as illustrated in FIG. 1B. The scale detection head 5 is an example of the position sensor. As illustrated in FIG. 1B, the scale detection head 5 is provided on the first unit 111, the second unit 112, the fifth unit 115, and the sixth unit 116 arranged in the positioning regions 31.

The scale detection head 5 is configured to magnetically or optically detect the linear scale 4. The scale detection head 5 generates a position detection signal which is a pulse signal, on the basis of the result of detecting the linear scale 4. The scale detection head 5 is electrically connected to the corresponding second controller section 22 via a cable 51. The position detection signal output from the scale detection head 5 is input to the corresponding second controller section 22.

In this way, the controller 2 determines the position of the mover 13 on the basis of the position detection signals input from the scale detection heads 5 in the positioning regions 31 so as to control driving of the mover 13.

The armature coil units 11 arranged in the transfer regions 32 do not include the scale detection head 5. Thus, the controller 2 performs sensor-free control in which control is performed without using position detection signals output from the scale detection heads 5. The sensor-free control will be described in detail later.

As described above, in the linear motor system 100 according to the present embodiment, the mover 13 includes the linear scale 4, and the linear scale 4 is detected using the plurality of scale detection heads 5. This configuration allows the linear scale 4 to have a shorter length, eliminating concerns about distortion of the linear scale or the like and contributing to cost cutting.

Also, as described above, in the linear motor system 100 according to the present embodiment, the scale detection heads 5 are provided on the armature coil units 11 arranged in the positioning regions 31. However, the scale detection heads 5 may be provided on the armature coil units 11 arranged in the transfer regions 32 in order to cope with the extended positioning regions 31 or an increase in the number of the positioning regions 31 in the movement path 3 of the mover 13.

Figure 2A:
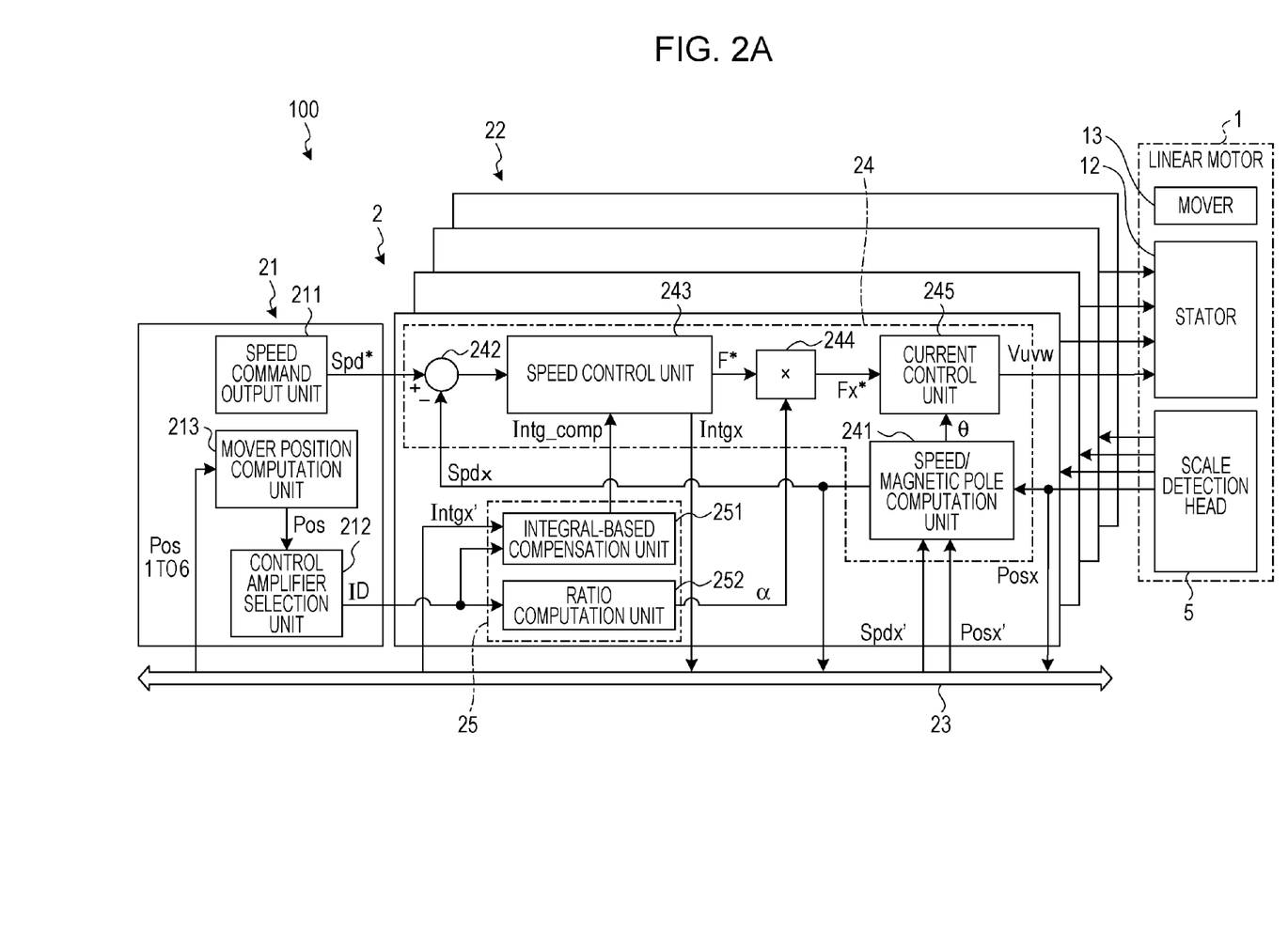
FIG. 2A is a block diagram illustrating the configuration of the linear motor system according to the embodiment.
Figure 2B:
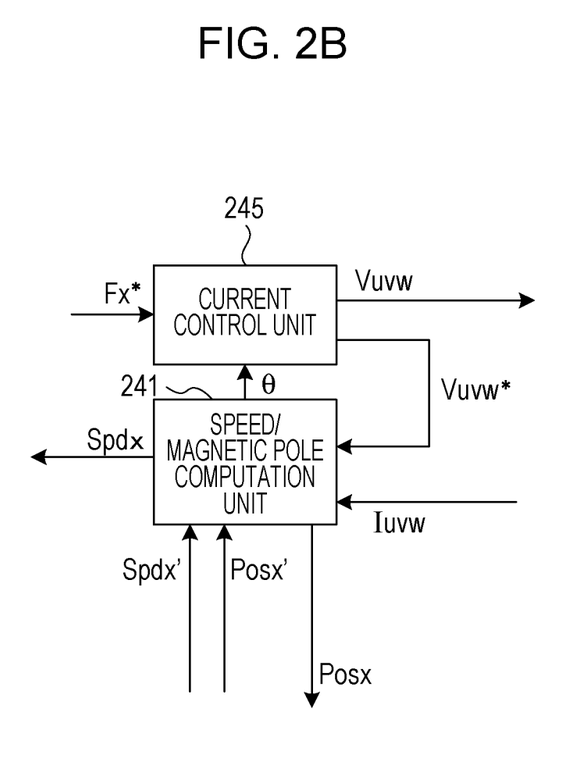
FIG. 2B is a block diagram illustrating a speed/magnetic pole computation unit included in a second controller section corresponding to an armature coil unit arranged in a transfer region.
Figure 3:
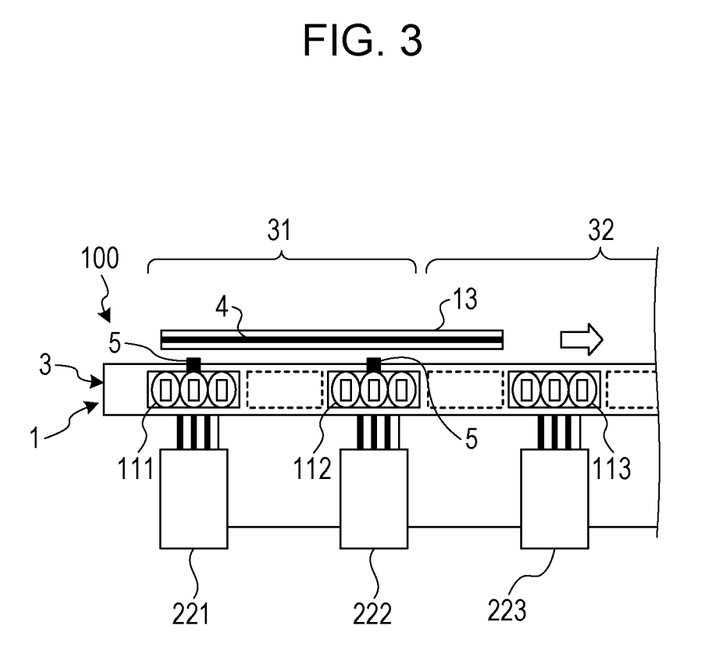
FIG. 3 is an explanatory diagram illustrating part of a movement path.
Figure 4:
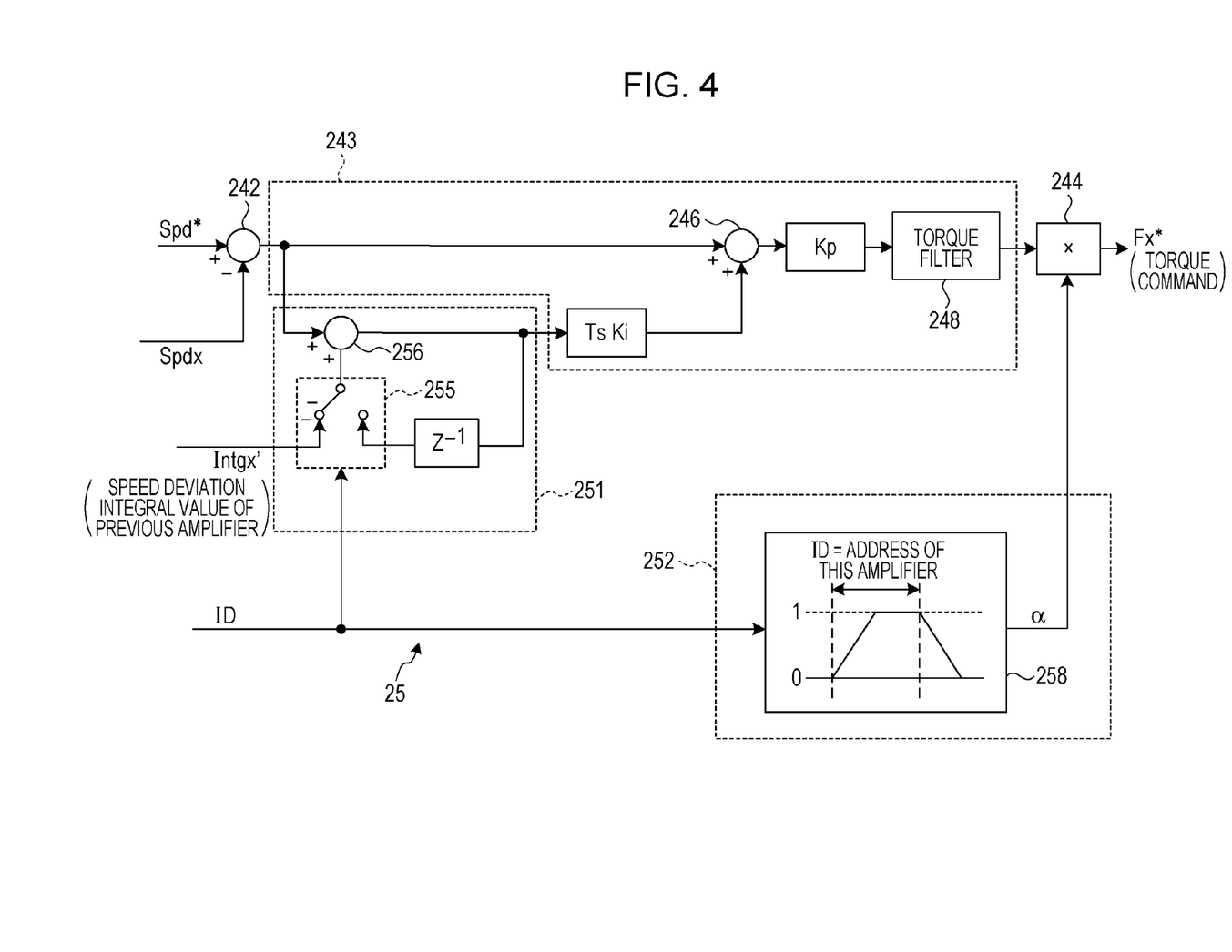
FIG. 4 is a block diagram illustrating the configuration of a power-feeding-switching compensation unit.

Referring now to FIGS. 2A to 4, the configuration of the linear motor system 100 according to the present embodiment will be described more specifically. FIG. 2A is a block diagram illustrating the configuration of the linear motor system 100 according to the present embodiment. FIG. 2B is a block diagram illustrating a speed/magnetic pole computation unit 241 included in the second controller section 22 corresponding to the armature coil unit 11 arranged in the transfer region 32. FIG. 3 is an explanatory diagram illustrating part of the movement path 3. FIG. 4 is a block diagram illustrating the configuration of a power-feeding-switching compensation unit 25.

As illustrated in FIG. 2A, the linear motor system 100 includes the linear motor 1 and the controller 2.

The linear motor 1 includes the stator 12 (see FIGS. 1A and 1B) which includes the plurality of armature coil units 11 (not illustrated in FIG. 2A) and the mover 13. The controller 2 includes the plurality of second controller sections 22 and the first controller section 21 which is a higher-level controller section of these second controller sections 22.

The plurality of armature coil units 11 are arranged spaced apart from one another along an X-axis direction (i.e., longitudinal direction of the movement path 3) representing the moving direction of the mover 13 illustrated in FIGS. 1A and 1B. The plurality of second controller sections 22 are each arranged for a corresponding one of the plurality of armature coil units 11.

The plurality of second controller sections 22 are connected to one another via a communication connection bus 23 used for communication and connection to the first controller section 21. Also, the region where the armature coil units 11 are arranged is divided into the positioning regions 31 and the transfer regions 32 (see FIG. 1B).

As illustrated in FIG. 2A, the first controller section 21 includes a speed command output unit 211, a mover position computation unit 213, and a control amplifier selection unit 212 (hereinafter, simply referred to as a "selection unit 212"). The speed command output unit 211 is configured to output a speed command Spd* to each of the second controller sections 22. The mover position computation unit 213 is configured to compute the position of the mover 13. The selection unit 212 is configured to output an ID.

That is, the first controller section 21 selects, as the target power-feeding controller, the second controller section 22 that performs power-feeding control for the corresponding armature coil unit 11 in accordance with the position of the mover 13 from among the plurality of second controller sections 22. The first controller section 21 then outputs a command for power-feeding control to the selected second controller section 22.

At this time, the selection unit 212 outputs an ID specifying the target power-feeding controller to the second controller sections 22. This ID represents the number specifying the selected second controller section 22. For example, suppose that the second controller sections 22 include the first amplifier 221 to the sixth amplifier 226 corresponding to the six armature coil units 11 (see FIG. 1B). In this case, ID1 to ID6 respectively correspond to the first amplifier 221 to the sixth amplifier 226.

The mover position computation unit 213 outputs a position signal Pos representing the position of the mover 13 to the selection unit 212, on the basis of position detection signals Pos1 to Pos6 regarding the mover 13 acquired via the communication connection bus 23.

In the linear motor system 100 according to the present embodiment, the linear scale 4 is not provided all over the movement path 3 but is provided in the mover 13. For this reason, the position of the mover 13 is not obtainable without any additional measures. Accordingly, the first controller section 21 switches between the second controller sections 22 that input position detection signals supplied from the scale detection heads 5, and computes the position of the mover 13 on the basis of position information obtained from the two second controller sections 22.

FIG. 3 is an explanatory diagram illustrating part of the movement path 3. As in FIGS. 1A and 1B, FIG. 3 illustrates the plurality of armature coil units 11 as the first unit 111, the second unit 112, the third unit 113, and so forth. Likewise, FIG. 3 illustrates the second controller sections 22 as the first amplifier 221, the second amplifier 222, the third amplifier 223, and so forth.

Suppose that the mover 13 is located in the positioning region 31 and is moving toward the second unit 112 from the first unit 111 as illustrated in FIG. 3. In this case, the first amplifier 221 outputs an initial value Pos(A) which is scale information obtained from the scale detection head 5. On the other hand, the second amplifier 222 corresponding to the second unit 112 outputs dPos(B) which is a positional difference obtained using the linear scale 4.

The mover position computation unit 213 of the first controller section 21 determines the position (Posi) of the mover 13 from the aforementioned two pieces of position information using Equation (1) below.

$$Posi = Pos(A) + dPos(B) \quad \quad \quad 1)$$

In the case where the mover 13 is located in the transfer region 32, there is no available position detection signal output from the scale detection head 5. Thus, the mover position computation unit 213 determines the position (Posi) of the mover 13 on the basis of position information estimated by the second controller section 22. How the second controller section 22 estimates the position of the mover 13 in the transfer region 32 will be described later.

The selection unit 212 receives the position signal Pos representing the position (Posi) of the mover 13 from the mover position computation unit 213. Then, based on the position signal Pos, the selection unit 212 outputs, to the second controller sections 22, an ID used to set the armature coil unit 11 opposing the mover 13 as the power-feeding target.

Specifically, the selection unit 212 identifies the armature coil unit 11 serving as the power-feeding target, by using the position signal Pos representing the position of the mover 13. Then, the selection unit 212 selects the second controller section 22 corresponding to the identified armature coil unit 11 as the target power-feeding controller, and outputs the ID representing the selected target power-feeding controller to the second controller sections 22 so as to cause the selected second controller section 22 to perform power-feeding control.

In FIG. 2A, signals representing the speed command Spd* and the ID are illustrated such that the signals are directly output from the first controller section 21 to only the certain second controller section 22. However, the signals are actually supplied to all the second controller sections 22 via the communication connection bus 23.

As described above, based on the position of the mover 13, the first controller section 21 sequentially switches the target power-feeding controller to the second controller section 22 corresponding to the armature coil unit 11 opposing the mover 13. Then, the first controller section 21 sequentially feeds power to the armature coil unit 11 serving as the power-feeding target from the corresponding second controller section 22 so as to produce thrust. In this way, the mover 13 can be driven.

The second controller sections 22 will be described next. The second controller sections 22 each control power-feeding to the corresponding armature coil unit 11 in accordance with the speed command Spd* received from the above-described first controller section 21, when receiving the ID indicating that the second controller section 22 is selected as the target power-feeding controller. The second controller sections 22 function as, for example, the first amplifier 221 to the sixth amplifier 226 illustrated in FIG. 1B and each feed power to the corresponding armature coil unit 11.

The plurality of second controller sections 22 each include a power-feeding control unit 24 and the power-feeding-switching compensation unit 25.

The power-feeding control unit 24 includes the speed/magnetic pole computation unit 241 (hereinafter, simply referred to as a "computation unit 241"), a subtracter 242, a speed control unit 243, a multiplier 244, and a current control unit 245.

The power-feeding control unit 24 performs computation for power-feeding control, on the basis of the speed command Spd* output from the speed command output unit 211 of the first controller section 21; and feeds power of a certain voltage Vuvw to the corresponding armature coil unit 11 on the basis of the computation result.

The computation unit 241 receives, via the communication connection bus 23, an X-axis position pulse Posx (Posx') representing position information obtained by the second controller section 22 corresponding to the armature coil unit 11 serving as the previous power-feeding target. The computation unit 241 then performs differentiation or the like on the position pulse Posx (or Posx') to convert the position pulse Posx (or Posx') into a speed, and outputs a speed signal Spdx representing the speed of the mover 13 to the subtracter 242. The computation unit 241 also computes a magnetic-pole position θ of the mover 13, and outputs the determined magnetic-pole position θ to the current control unit 245. Note that the X-axis represents the moving direction of the mover 13 along the movement path 3.

Now, the position pulses Posx and Posx' and a speed feedback value Spdx' will be described. Note that, in the following description, the second controller section 22 corresponding to the armature coil unit 11 opposing the mover 13 may be referred to as a target section and the other second controller sections 22 may be referred to as other sections.

The position pulse Posx is an information signal output from the scale detection head 5 and received by the target section from the scale detection head 5 (i.e., position information for controlling the position of the mover 13 on the movement path 3). In contrast, the position pulse Posx' is a signal received by the other sections via the communication connection bus 23 and corresponds to the signal received by the target section from the scale detection head 5. Alternatively, the position pulse Posx' is a signal estimated by the other sections other than the target section.

The speed feedback value Spdx' is a signal obtained through differentiation of the estimated speed of the mover 13 obtained from the other second controller sections 22 (i.e., other sections) or of a signal input to the second controller section 22 (i.e., the target section) corresponding to the armature coil unit 11 opposing the mover 13.

As illustrated in FIG. 2B, the computation unit 241 of the second controller section 22 corresponding to the armature coil unit 11 arranged in the transfer region 32 receives a current value Iuvw detected by a certain detector and a voltage command Vuvw* output from the current control unit 245. Then, an estimation unit 71 (described later, see FIG. 5) included in the computation unit 241 determines an estimated phase $\hat{\theta}[k]$ and an estimated speed $\hat{\omega}_{lpf}[k]$. Based on the estimated phase $\hat{\theta}[k]$ and the estimated speed $\hat{\omega}_{lpf}[k]$, the estimation unit 71 also determines a mover position $\text{pos}\hat{x}[k]$ and a mover speed $\text{spd}\hat{x}[k]$. The computation unit 241 further calculates the magnetic-pole position θ from the mover position $\text{pos}\hat{x}[k]$ and the position pulse Posx', and calculates the speed signal spdx from the mover speed $\text{spd}\hat{x}[k]$ and the speed feedback value Spdx'.

The subtracter 242 compares the speed command Spd* obtained from the first controller section 21 via the communication connection bus 23 with the speed signal Spdx received from the computation unit 241; and outputs a deviation (i.e., speed deviation) between the speed command Spd* and the speed signal Spdx to the speed control unit 243.

The speed control unit 243 receives the speed deviation from the subtracter 242 and an X-axis integral-based compensation value Intg_comp from an integral-based compensation unit 251 of the power-feeding-switching compensation unit 25 (described below). The speed control unit 243 performs computation using these received values, and outputs a certain torque command F*.

As illustrated in FIG. 4, the speed control unit 243 includes an integrator TsKi, an adder 246, and a torque filter 248. The speed control unit 243 generates the torque command F* using a speed integral value obtained through integration of the speed deviation input from the subtracter 242.

The multiplier 244 multiplies the torque command F* received from the speed control unit 243 by a ratio α output from a ratio computation unit 252 of the power-feeding-switching compensation unit 25 (described later), and outputs a compensated appropriate torque command Fx* to the current control unit 245.

The current control unit 245 includes a power converter (not illustrated) including an inverter circuit. The current control unit 245 controls a current fed to the corresponding armature coil unit 11 on the basis of the torque command Fx* based on the speed command Spd*, and feeds power to the corresponding armature coil unit 11 included in the stator 12 at the certain voltage Vuvw.

The power-feeding-switching compensation unit 25 will be described next. The power-feeding-switching compensation unit 25 has a function of performing switching compensation related to switching performed by the power-feeding control unit 24 when receiving the ID output from the first controller section 21. That is, the power-feeding-switching compensation unit 25 has a function of performing compensation in computation for power-feeding control performed by the power-feeding control unit 24.

In the present embodiment, switching compensation is performed, for example, through integral-based compensation or ratio computation. As illustrated in FIG. 2A, the power-feeding-switching compensation unit 25 includes the integral-based compensation unit 251 and the ratio computation unit 252.

The integral-based compensation unit 251 according to the present embodiment sets the speed integral value held by the second controller section 22 selected as the target power-feeding controller immediately before the present target power-feeding controller, as a speed integral value to be used by the speed control unit 243 of the second controller section 22 serving as the present target power-feeding controller. For example, a description will be given with reference to FIG. 1B. In the case where the mover 13 passes over the fifth unit 115 and moves to the sixth unit 116, the integral-based compensation unit 251 sets the speed integral value held by the fifth amplifier 225 as a speed integral value to be used by the speed control unit 243 of the sixth amplifier 226.

As illustrated in FIG. 4, the integral-based compensation unit 251 includes a switch unit 255 and an adder 256. The integral-based compensation unit 251 performs the process when receiving the ID output from the first controller section 21.

As illustrated in FIG. 4, the switch unit 255 is configured to be switched when the integral-based compensation unit 251 according to the present embodiment receives the ID indicating that this second controller section 22 is selected as the target power-feeding controller from the first controller section 21.

For example, in the aforementioned case where the mover 13 passes over the fifth unit 115 and moves to the sixth unit 116, an speed-deviation integral value Intgx' used by the fifth amplifier 225 is input as a speed integral value to be used by the speed control unit 243 of the sixth amplifier 226. Thereafter, the switch unit 255 is switched to form an ordinary loop, and the X-axis integral-based compensation value Intg_comp is output as the speed integral value from the integral-based compensation unit 251 to the speed control unit 243.

As described above, in the linear motor system 100 according to the present embodiment, the speed integral value used immediately before the switching is taken over between the two second controller sections 22 that are switched between as the target power-feeding controller. With this configuration, the switching shock is suppressed. The integral-based compensation unit 251 does not necessarily include the switch unit 255 to receive the speed-deviation integral value Intgx' from the previous second controller section 22, and any given configuration may be employed as long as the speed-deviation integral value Intgx' is input from the previous second controller section 22 at a timing at which the target power-feeding controller is switched.

The ratio computation unit 252 includes a ratio calculator 258. For example, the ratio computation unit 252 calculates a torque ratio so as to allow the mover 13 to move smoothly. With this configuration, interference between outputs of the second controller sections 22 is suppressed.

Specifically, when receiving an ID indicating that this second controller section 22 is selected as the target power-feeding controller from the first controller section 21, the ratio computation unit 252 determines a torque ratio α on the basis of a position of the mover 13 in order to suppress control interference between the second controller sections 22 selected as the previous and present target power-feeding controllers. The multiplier 244 multiplies the torque command F* by the obtained torque ratio α so as to obtain the torque command Fx* to be input to the current control unit 245. In this way, switching compensation is performed.

For example, suppose that the moving mover 13 is located over both the fifth unit 115 and the sixth unit 116 as illustrated in FIG. 1B. The ratio computation unit 252 determines the torque ratio α so that the torque command Fx* which allows thrust produced by the fifth unit 115 and thrust produced by the sixth unit 116 to fall and rise linearly, respectively, is to be output to the current control unit 245.

Specifically, the ratio computation unit 252 determines the torque ratio α in accordance with a distance between the mover 13 and the fifth unit 115 and a distance between the mover 13 and the sixth unit 116, so as to suppress control interference between the fifth unit 115 and the sixth unit 116.

Accordingly, switching compensation is performed such that thrust produced by the fifth unit 115 gradually decreases at a certain slope and thrust produced by the sixth unit 116 gradually increases at the certain slope. As a result, the mover 13 smoothly moves over from the fifth unit 115 to the sixth unit 116.

As described above, when the armature coil unit 11 is switched to be the power-feeding target, the corresponding power-feeding-switching compensation unit 25 according to the present embodiment performs power-feeding-control switching compensation for the armature coil unit 11 serving as the present power-feeding target, on the basis of a state of control performed by the second controller section 22 selected as the target feeding-control controller immediately before the present one. Accordingly, the switching shock of the mover 13 may be suppressed when the armature coil unit 11 serving as the power-feeding target is switched.

Now, a description will be given of sensor-free control performed by the second controller section 22 corresponding to the armature coil unit 11 arranged in the transfer region 32 in which the mover 13 moves at a substantially constant speed. Also, a description will be given of switching compensation using the estimated result obtained by the estimation unit 71.

Figure 5:
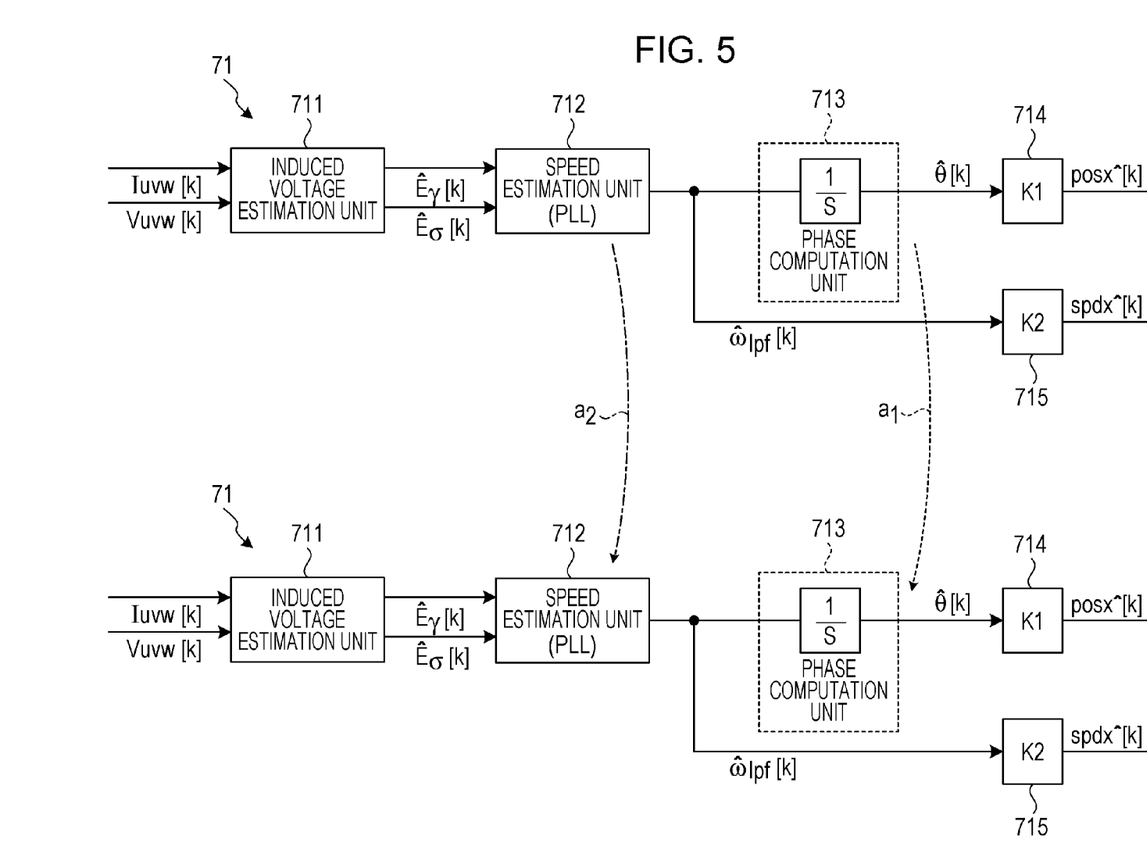
FIG. 5 is a block diagram illustrating an estimation unit included in a power-feeding control unit included in the second controller section configured to perform sensor-free control.

FIG. 5 is a block diagram illustrating the estimation unit 71 included in the computation unit 241 of the power-feeding control unit 24 of the second controller section 22 configured to perform sensor-free control. It is assumed that the second controller sections 22 used in this case are the third amplifier 223 and the fourth amplifier 224 which are the second controller sections 22 respectively corresponding to the third unit 113 and the fourth unit 114 arranged in the transfer region 32 in FIG. 1B. Accordingly, the estimation unit 71 of the third amplifier 223 is illustrated in the upper part of FIG. 5 and the estimation unit 71 of the fourth amplifier 224 is illustrated in the lower part of FIG. 5. These two estimation units 71 have the same configuration.

As illustrated in FIG. 5, the estimation unit 71 includes an induced voltage estimation unit 711, a speed estimation unit 712, and a phase computation unit 713. The induced voltage estimation unit 711 (e.g., an induced voltage estimator or observer) outputs estimated induced voltages $\hat{E}_\gamma$ and $\hat{E}_\delta$ to the speed estimation unit 712.

The speed estimation unit 712 includes a phase locked loop (PLL) circuit, and outputs the estimated speed $\hat{\omega}_{lpf}[k]$ on the basis of the received estimated induced voltages $\hat{E}_\gamma$ and $\hat{E}_\sigma$. The phase computation unit 713 receives the estimated speed $\hat{\omega}_{lpf}[k]$, determines the integral of the estimated speed $\hat{\omega}_{lpf}[k]$, and outputs the estimated phase $\hat{\theta}[k]$. Also, as described above, the estimation unit 71 estimates the mover position posx^[k] used to calculate the magnetic-pole position θ and the mover speed spdx^[k] used to calculate the speed signal spdx, on the basis of the estimated phase $\hat{\theta}[k]$ and the estimated speed $\hat{\omega}_{lpf}[k]$. As illustrated in FIG. 5, the mover position posx^[k] is obtained by a first computation unit 714 by multiplying the estimated phase $\hat{\theta}[k]$ by K1 which is a transformation coefficient used for transformation between the magnetic pole and the mover position. Also, the mover speed spdx^[k] is obtained by a second computation unit 715 by multiplying the estimated speed $\hat{\omega}_{lpf}[k]$ by K2 which is a transformation coefficient used for transformation between the electric angular speed and the mover speed.

The estimation units 71 are configured such that the estimated phase $\hat{\theta}[k]$ and the estimated speed $\hat{\omega}_{lpf}[k]$ calculated by the estimation unit 71 of the second controller section 22 corresponding to the armature coil unit 11 serving as the previous power-feeding target are taken over between the second controller sections 22 (see an arrow $a_1$). Specifically, when the armature coil unit 11 serving as the power-feeding target is switched to another armature coil unit 11, the estimated phase $\hat{\theta}[k]$ and the estimated speed $\hat{\omega}_{lpf}[k]$ calculated by the estimation unit 71 of the preceding second controller section 22 are supplied to the estimation unit 71 of the following second controller section 22. Consequently, the estimated phase $\hat{\theta}[k]$ and the estimated speed $\hat{\omega}_{lpf}[k]$ for the previous power-feeding target are set as the estimated phase $\hat{\theta}[k]$ and the estimated speed $\hat{\omega}_{lpf}[k]$ for the next power-feeding target.

The estimation unit 71 then outputs, as estimated position information, the estimated position pulse Posx' based on the estimated phase $\hat{\theta}[k]$ and the estimated speed $\hat{\omega}_{lpf}[k]$. Specifically, the position pulse Posx output from the scale detection head 5 is not made available to the second controller section 22 corresponding to the armature coil unit 11 arranged in the transfer region 32. Accordingly, the estimated position pulse Posx' obtained by the estimation unit 71 is output as alternative information of the position pulse Posx output from the scale detection head 5.

Preferably, switching compensation based on the estimated result obtained by the estimation unit 71 is performed slightly before the ID is output from the first controller section 21, that is, before compensation based on the integral value and the ratio computation is performed. To realize this, an appropriate method can be employed. For example, in the case where the first controller section 21 determines that the mover 13 is located in the transfer region 32, a command signal specifying a timing at which the estimation unit 71 is to perform switching compensation may be output separately from the above-described ID.

As described above, in the linear motor system 100 according to the present embodiment, the estimation unit 71 included in the power-feeding control unit 24 of the second controller section 22 configured to perform sensor-free control also functions as an example of the power-feeding-switching compensation unit. Such switching compensation can speed up rising of the signal when the target power-feeding controller is switched to another one in the transfer region 32 where sensor-free control is performed, and allows estimation errors to converge as soon as possible by increasing the responsivity of sensor-free control.

In the above-described example, the estimated phase $\hat{\theta}[k]$ and the estimated speed $\hat{\omega}_{lpf}[k]$ calculated by the estimation unit 71 of the second controller section 22 corresponding to the armature coil unit 11 serving as the previous power-feeding target are supplied to the estimation unit 71 of the following second controller section 22 as indicated by the arrow $a_1$. Alternatively, for example, the estimated speed $\hat{\omega}_{lpf}[k]$ obtained by the speed estimation unit 712 may be supplied from the previous second controller section 22 to the following second controller section 22 as indicated by an arrow $a_2$ in FIG. 5.

As described above, the setting of the process performed by the computation unit 241 of the power-feeding control unit 24 alone is different between the second controller sections 22 corresponding to the armature coil units 11 arranged in the positioning regions 31 and the second controller sections 22 corresponding to the armature coil units 11 arranged in the transfer regions 32. The linear motor system 100 according to the present embodiment employs the plurality of second controller sections 22 having the same configuration. The computation unit 241 of the second controller sections 22 corresponding to the armature coil units 11 arranged in the transfer regions 32 are configured to estimate the estimated phase $\hat{\theta}[k]$ and the estimated speed $\hat{\omega}_{lpf}[k]$ of the mover 13. Alternatively, the second controller sections 22 corresponding to the armature coil units 11 arranged in the transfer regions 32 and the second controller sections 22 corresponding to the armature coil units 11 arranged in the positioning regions 31 may have different configurations.

Figure 6:
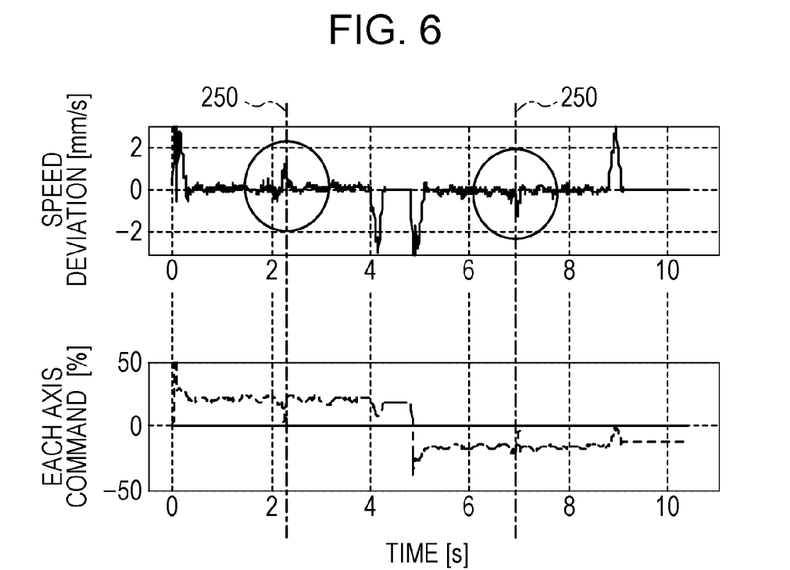
FIG. 6 is a diagram illustrating operation waveforms obtained in the case where power-feeding switching compensation is not performed.
Figure 7:
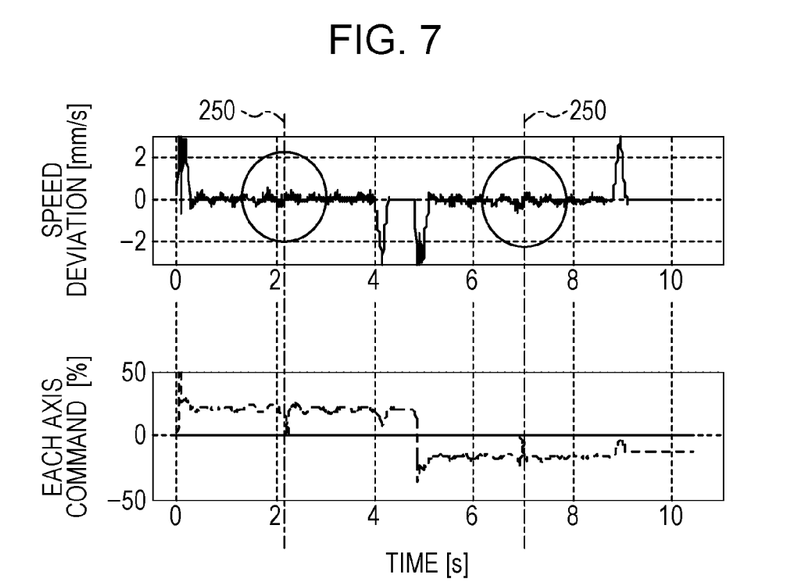
FIG. 7 is a diagram illustrating operation waveforms obtained in the case where power-feeding switching compensation is performed.

FIG. 6 is a diagram illustrating operation waveforms obtained in the case where power-feeding switching compensation is not performed. FIG. 7 is a diagram illustrating operation waveforms obtained in the case where power-feeding switching compensation is performed. The linear motor system 100 according to the present embodiment includes the power-feeding-switching compensation unit 25. Thus, as illustrated in FIG. 7, an operation waveform representing the speed deviation is relatively stable before and after the power-feeding target is switched to the next one, and abrupt variations do not occur. Specifically, compared with the operation waveforms obtained in the case where power-feeding switching compensation is not performed as illustrated in FIG. 6, variations in the operation waveforms obtained in the case where power-feeding switching compensation is performed are reduced as illustrated in FIG. 7.

Upper graphs illustrated in FIGS. 6 and 7 each represent the speed deviation, and lower graphs illustrated in FIGS. 6 and 7 each represent the thrust command. Also, in the upper graphs illustrated in FIGS. 6 and 7, each region including a timing 250 at which the second controller section 22 serving as the target power-feeding controller is switched to another one is encircled.

Figure 8:
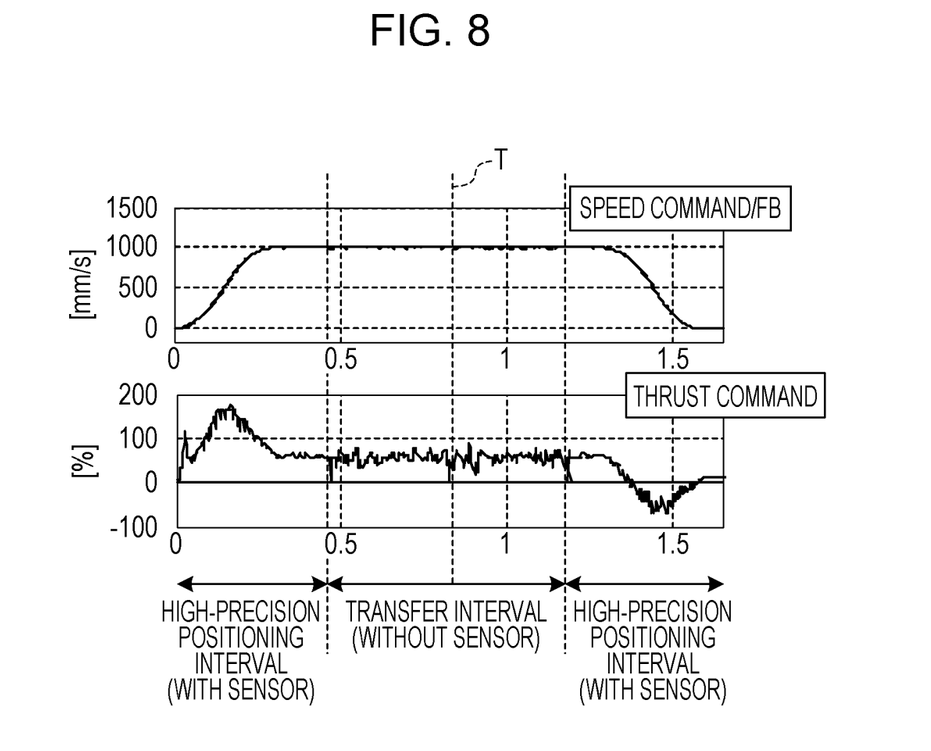
FIG. 8 is a diagram illustrating how a speed command and a thrust command change in a positioning region and a transfer region.

FIG. 8 is a diagram illustrating how the speed command and the thrust command change in the positioning regions 31 and the transfer regions 32 in the linear motor system 100 according to the present embodiment. An upper graph illustrated in FIG. 8 represents a change in the speed command, and a lower graph illustrated in FIG. 8 represents a change in the thrust command. In FIG. 8, a transfer interval (without sensor) corresponds to the transfer region 32, and a high-precision positioning interval (with sensor) corresponds to the positioning region 31.

As illustrated in FIG. 8, in the linear motor system 100 according to the present embodiment, the thrust command changes in accordance with the speed command in the transfer region 32. For example, the mover 13 moves at a substantially constant speed in accordance with the speed command in the transfer region 32 in which sensor-free control is performed without using any detection signal from the scale detection head 5. FIG. 8 reveals that the thrust command has small variations during sensor-free control.

Specifically, in the linear motor system 100 according to the present embodiment, the above-described switching compensation is performed also in the transfer regions 32 including a timing T at which the second controller section 22 serving as the target power-feeding controller is switched to another one. As a result, the switching shock is suppressed.

In the linear motor system 100 according to the present embodiment which includes the configuration illustrated in FIG. 2A, power-feeding to the armature coil units 11 is controlled in accordance with the speed command. However, the second controller section 22 which is a lower-level controller section may control power-feeding to the armature coil unit 11 serving as the power-feeding target, in accordance with the torque command supplied from the first controller section 21 which is a higher-level controller section.

Figure 9A:
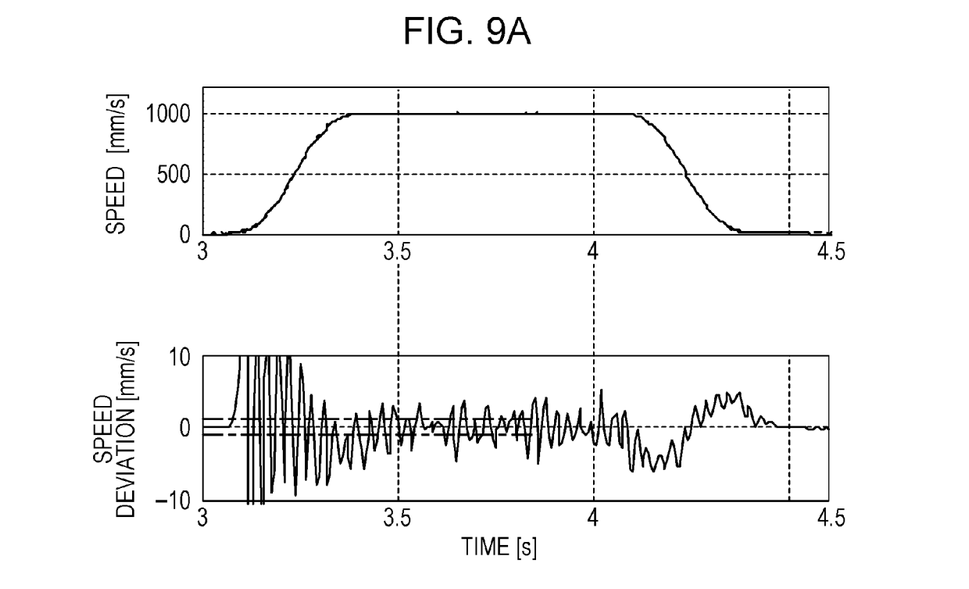
FIG. 9A is a diagram illustrating comparative examples of a speed command and a speed deviation in the case of torque-command-based switching.
Figure 9B:
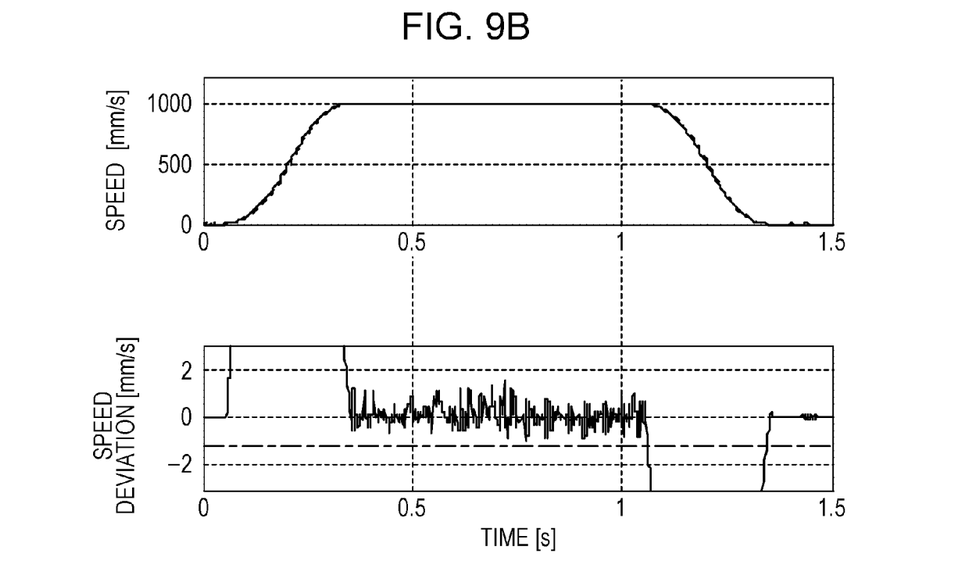
FIG. 9B is a diagram illustrating a speed command and a speed deviation in the case of speed-command-based switching employed in the linear motor system according to the embodiment.

Now, a benefit of power-feeding control based on the speed command will be described through comparison between FIGS. 9A and 9B. FIG. 9A is a diagram illustrating comparative examples of the speed command and the speed deviation in the case of torque-command-based switching. FIG. 9B is a diagram illustrating the speed command and the speed deviation in the case of speed-command-based switching employed in the linear motor system 100 according to the present embodiment. Upper graphs illustrated in FIGS. 9A and 9B each illustrate a response speed to the speed command, and lower graphs illustrated in FIGS. 9A and 9B each illustrate the speed deviation.

The first controller section 21 (i.e., the higher-level controller section) and the second controller sections 22 (i.e., the lower-level controller sections) are connected to each other via the communication connection bus 23. Thus, because of a communication delay, the signal representing the speed deviation includes large variations as illustrated by the comparative example of FIG. 9A. That is, FIG. 9A indicates that it is difficult to increase the precision of control.

In contrast, in the case of power-feeding control based on the speed command, the speed deviation is relatively stable as illustrated in FIG. 9B. That is, FIG. 9B indicates that power-feeding control based on the speed command can realize more precise control than power-feeding control based on the torque command.

As described above, the linear motor system 100 according to the present embodiment uses an MM linear motor including the mover 13 which includes the permanent magnet 131 and the armature coil units 11 arranged spaced apart from one another along the moving direction of the mover 13. Accordingly, the linear motor system 100 can reduce the number of wiring lines and the cost, and thus can be suitably used for long-distance transportation.

Also, in the linear motor system 100 according to the present embodiment, the plurality of second controller sections 22 are connected to one another via the communication connection bus 23 used for communication with the first controller section 21. The power-feeding-switching compensation unit 25 of the second controller section 22 selected as the target power-feeding controller is configured to perform switching compensation by continuously using, after the switching, control values used in power-feeding control by the second controller section 22 serving as the previous target power-feeding controller.

This configuration thus can increase precision of power-feeding-control switching compensation, and allows the linear motor system 100 to perform more stable power-feeding control. The timing at which the switching compensation is performed is not limited to the above-described example and may be set appropriately.

The numbers of and the positions of positioning regions 31 and of transfer regions 32 provided in the movement path 3 of the linear motor system 100 are not limited to the ones described in the above-described embodiment, and can be set to any given values.

It should be understood by those skilled in the art that various modifications, combinations, sub-combinations and alterations may occur depending on design requirements and other factors insofar as they are within the scope of the appended claims or the equivalents thereof.

What is claimed is:

1. A linear motor system comprising:
a stator including a plurality of armature coil units linearly arranged so as to be spaced apart from one another at certain intervals;
a mover arranged so as to oppose the stator and including a permanent magnet; and
a controller configured to
sequentially select an armature coil unit opposing the mover from among the plurality of armature coil units, the selected armature coil unit serving as a power-feeding target,
perform, for the power-feeding target, computation for power-feeding control on the basis of a speed command, and
sequentially feed power to the armature coil unit serving as the power-feeding target in accordance with a result of the computation so as to drive the mover, wherein
the controller includes
a power-feeding-switching compensation function of performing, when the power-feeding target is switched to a next armature coil unit, switching compensation related to power-feeding control performed on the next armature coil unit.

2. The linear motor system according to claim 1, wherein the controller includes
a first controller section, and
a plurality of second controller sections each provided for a corresponding one of the plurality of armature coil units,
the first controller section includes
a speed command output unit configured to output a speed command to the second controller sections, and
a selection unit configured to sequentially select a second controller section corresponding to the armature coil unit opposing the mover from among the plurality of second controller sections, the selected second controller section serving as a target power-feeding controller, and
the plurality of second controller sections each include
a power-feeding control unit configured to perform, in a case where the second controller section is selected as the target power-feeding controller, computation for power-feeding control on the basis of the speed command output from the first controller section and to feed power to the corresponding armature coil unit in accordance with a result of the computation, and
a power-feeding-switching compensation unit configured to perform, when the power-feeding control unit performs the computation for power-feeding control, the switching compensation related to the power-feeding control performed by the power-feeding control unit.

3. The linear motor system according to claim 2, further comprising
a position sensor configured to detect a position of the mover, wherein
the selection unit is configured to select, as the target power-feeding controller, the second controller section corresponding to the armature coil unit opposing the mover on the basis of a position detection signal output by the position sensor.

4. The linear motor system according to claim 3, wherein
a region in which the plurality of armature coil units are arranged is divided into a positioning region and a transfer region,
the second controller section corresponding to the armature coil unit arranged in the positioning region is configured to perform position-based control using the position detection signal output by the position sensor, and
the second controller section corresponding to the armature coil unit arranged in the transfer region is configured to perform sensor-free control without using the position detection signal.

5. The linear motor system according to claim 3, wherein
the mover includes a linear scale, and
the position sensor is a scale detection head included in the armature coil unit and configured to detect the linear scale so as to detect the position of the mover.

6. The linear motor system according to claim 2, wherein
the plurality of second controller sections are connected to the first controller section via a communication connection so as to be connected to one another via the communication connection, and
the power-feeding-switching compensation unit of the second controller section presently selected as the target power-feeding controller is configured to perform the switching compensation on the basis of a state of power-feeding control performed by the second controller section selected as the target power-feeding controller immediately before the present target power-feeding controller.

7. The linear motor system according to claim 6, wherein the power-feeding control unit includes
    a speed control unit configured to generate a torque command by using a speed integral value which is an integral of a deviation between the speed command and a speed of the mover, and
the power-feeding-switching compensation unit is configured to perform the switching compensation by setting a speed integral value held by the second controller section selected as the target power-feeding controller immediately before the present target power-feeding controller, as a speed integral value to be used by the speed control unit.

8. The linear motor system according to claim 6, wherein the power-feeding control unit includes
    an estimation unit configured to compute an estimated phase and an estimated speed of the mover, and
the power-feeding-switching compensation unit is configured to perform the switching compensation by setting an estimated phase and an estimated speed obtained by the second controller section selected as the target power-feeding controller immediately before the present target power-feeding controller, as an estimated phase and an estimated speed to be used by the estimation unit.

9. The linear motor system according to claim 6, wherein the power-feeding control unit includes
    a current control unit configured to control a current fed to the corresponding armature coil unit, in accordance with a torque command based on the speed command, and
the power-feeding-switching compensation unit is configured to perform the switching compensation by multiplying the torque command to be input to the current control unit by a torque ratio determined in accordance with a positional relationship between the mover and the second controller section selected as the target power-feeding controller immediately before the present target power-feeding controller.

10. A linear motor system comprising:
    a stator including a plurality of armature coil units linearly arranged so as to be spaced apart from one another at certain intervals;
    a mover arranged so as to oppose the stator and including a permanent magnet; and
    controller means for
        sequentially selecting an armature coil unit opposing the mover from among the plurality of armature coil units, the selected armature coil unit serving as a power-feeding target,
        performing, for the power-feeding target, computation for power-feeding control on the basis of a speed command, and
        sequentially feeding power to the armature coil unit serving as the power-feeding target in accordance with a result of the computation so as to drive the mover,
    wherein
    the controller means includes
        a power-feeding-switching compensation function of performing, when the power-feeding target is switched to a next armature coil unit, switching compensation related to power-feeding control performed on the next armature coil unit.

11. The linear motor system according to claim 10, wherein the controller means includes
    a first controller section, and
    a plurality of second controller sections each provided for a corresponding one of the plurality of armature coil units,
the first controller section includes
    speed command output means for outputting a speed command to the second controller sections, and
    selection means for sequentially selecting a second controller section corresponding to the armature coil unit opposing the mover from among the plurality of second controller sections, the selected second controller section serving as a target power-feeding controller, and
the plurality of second controller sections each include
    power-feeding control means for performing, in a case where the second controller section is selected as the target power-feeding controller, computation for power-feeding control on the basis of the speed command output from the first controller section and for feeding power to the corresponding armature coil unit in accordance with a result of the computation, and
    power-feeding-switching compensation means for performing, when the power-feeding control means performs the computation for power-feeding control, the switching compensation related to the power-feeding control performed by the power-feeding control means.

12. The linear motor system according to claim 11, further comprising
    position sensor means for detecting a position of the mover, wherein
    the selection means is configured to select, as the target power-feeding controller, the second controller section corresponding to the armature coil unit opposing the mover on the basis of a position detection signal output by the position sensor means.

13. The linear motor system according to claim 12, wherein a region in which the plurality of armature coil units are arranged is divided into a positioning region and a transfer region,
    the second controller section corresponding to the armature coil unit arranged in the positioning region is configured to perform position-based control using the position detection signal output by the position sensor means, and
    the second controller section corresponding to the armature coil unit arranged in the transfer region is configured to perform sensor-free control without using the position detection signal.

14. The linear motor system according to claim 12, wherein the mover includes a linear scale, and
    the position sensor means is a scale detection head included in the armature coil unit and configured to detect the linear scale so as to detect the position of the mover.

15. The linear motor system according to claim 11, wherein the plurality of second controller sections are connected to the first controller section via communication connection means so as to be connected to one another via the communication connection means, and
    the power-feeding-switching compensation means of the second controller section presently selected as the target power-feeding controller is configured to perform the switching compensation on the basis of a state of power-feeding control performed by the second controller section selected as the target power-feeding controller immediately before the present target power-feeding controller.

16. The linear motor system according to claim 15, wherein the power-feeding control means includes
- speed control means for generating a torque command by using a speed integral value which is an integral of a deviation between the speed command and a speed of the mover, and the power-feeding-switching compensation means is configured to perform the switching compensation by setting a speed integral value held by the second controller section selected as the target power-feeding controller immediately before the present target power-feeding controller, as a speed integral value to be used by the speed control means.

17. The linear motor system according to claim 15, wherein the power-feeding control means includes
- estimation means for computing an estimated phase and an estimated speed of the mover, and the power-feeding-switching compensation means is configured to perform the switching compensation by setting an estimated phase and an estimated speed obtained by the second controller section selected as the target power-feeding controller immediately before the present target power-feeding controller, as an estimated phase and an estimated speed to be used by the estimation means.

18. The linear motor system according to claim 15, wherein the power-feeding control means includes
- current control means for controlling a current fed to the corresponding armature coil unit, in accordance with a torque command based on the speed command, and the power-feeding-switching compensation means is configured to perform the switching compensation by multiplying the torque command to be input to the current control means by a torque ratio determined in accordance with a positional relationship between the mover and the second controller section selected as the target power-feeding controller immediately before the present target power-feeding controller.

* * * * *